O. E. DOOLITTLE.
Preserving Fruit.
No. 78,437.
Patented June 2, 1868.
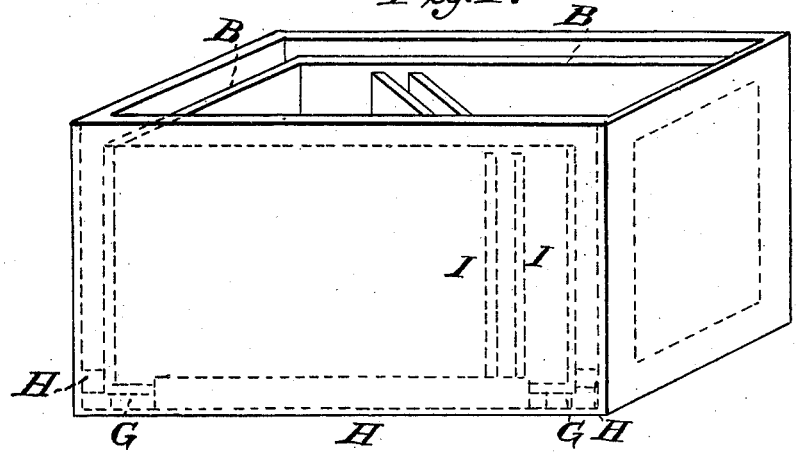
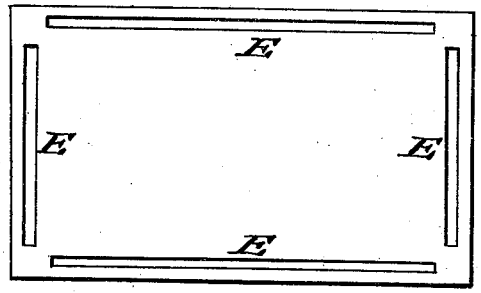
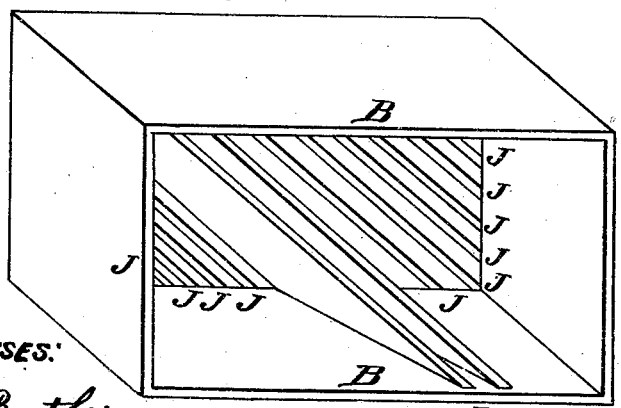

United States Patent Office.

O. E. DOOLITTLE, OF BOSTON, MASSACHUSETTS.

Letters Patent No. 78,437, dated June 2, 1868.

IMPROVED FRUIT-PRESERVING BOX.

*The Schedule referred to in these Letters Patent and making part of the same.*

TO ALL WHOM IT MAY CONCERN:

Be it known that I, O. E. DOOLITTLE, of Boston, in the county of Suffolk, and State of Massachusetts, have invented a new and improved Device for Preserving Fruit; and I do hereby declare that the following is a full and exact description thereof, reference being had to the accompanying drawings, and to the letters of reference marked thereon.

And in the drawings—

Figure 1 represents two boxes, one inside of the other, with the lids or covers off.

Figure 2 represents the inner box placed on its side, to show the interior thereof.

Figure 3 is a view of the reversed cover of the inner box.

B B, figs. 1 and 2, show the inner box placed (in fig. 1) in the outer box, with spaces left empty all around the sides and at the bottom between the two boxes. D, fig. 3, shows the cover of the inner box reversed, with strips of wood, E E E E, on the under side to keep the cover fast. G G, fig. 1, (dotted lines,) are strips of wood fastened on the bottom of the inside of the outer box, upon which the inner box rests. H H H, fig. 1, (dotted lines,) are strips of wood fastened of the sides of the inside of the outer box, to prevent the inner box from shifting its place laterally. I I, figs. 1 and 2, are two bulk-heads or partitions running diagonally across the inside of the inner box, with a space between them. This space is filled with charcoal, or other substance absorbent of moisture. J J J J J J J J J, fig. 2, are slats running diagonally across the otherwise open bottom of the inner box B B. And I sometimes pack the cover of the inner box with rubber packing, or some other compressible substance. And I do not confine myself to the use of charcoal, but I use any substance absorbent of evaporated moisture.

And the operation of my device is this: I place my absorbent substance in the space between the two bulkheads I I, and, placing the inner box B B into the outer one, I pack my fruit therein, and fasten down the tops of both the inner and the outer boxes. The moisture evaporating from the fruit is absorbed by the absorbent substance deposited between the bulk-heads, and the large body of air contained between the inner and outer boxes assists in the preservation of the fruit.

And what I claim herein as of my own invention, and desire to secure by Letters Patent, is—

1. The combination and arrangement of two or more boxes, the inner one being the containing-box, and the space between filled with air, and communicating with the inside of the containing-box by the help of slats or apertures, when the same is used in combination with a moisture-absorbing substance contained within the limits of the inner box for the purpose of preserving fruit, all substantially as described.

2. In boxes for preserving or containing fruit, the placing of a moisture-absorbing substance or substances in communication with the atmosphere around the fruit, all substantially as and for the purpose described.

O. E. DOOLITTLE.

Witnesses:
J. H. BUTLER,
A. KINGSBURY.